(12) United States Patent
Kettemer

(10) Patent No.: US 9,069,347 B2
(45) Date of Patent: Jun. 30, 2015

(54) MACHINE TOOL COMPRISING A DEVICE FOR COLLISION MONITORING

(75) Inventor: Rolf Kettemer, Marktoberdorf (DE)

(73) Assignee: DECKEL MAHO PFRONTEN GMBH, Pfronten (DE)

(*) Notice: Subject to any disclaimer, the term of this patent is extended or adjusted under 35 U.S.C. 154(b) by 520 days.

(21) Appl. No.: 13/358,150

(22) Filed: Jan. 25, 2012

(65) Prior Publication Data

US 2012/0221137 A1  Aug. 30, 2012

(30) Foreign Application Priority Data

Jan. 31, 2011 (DE) .......................... 10 2011 003 374
Sep. 18, 2011 (EP) ...................................... 11181729

(51) Int. Cl.
*G06F 19/00* (2011.01)
*G05B 19/4061* (2006.01)

(52) U.S. Cl.
CPC .. *G05B 19/4061* (2013.01); *G05B 2219/37237* (2013.01); *G05B 2219/37432* (2013.01); *G05B 2219/39082* (2013.01); *G05B 2219/49141* (2013.01); *G05B 2219/49143* (2013.01)

(58) Field of Classification Search
CPC .................................................. G05B 19/4061
USPC ........................................................ 700/108
See application file for complete search history.

(56) References Cited

U.S. PATENT DOCUMENTS

| | | | |
|---|---|---|---|
| 4,456,960 A * | 6/1984 | Wakai | 700/175 |
| 4,912,384 A * | 3/1990 | Kinoshita et al. | 318/569 |
| 6,295,510 B1 * | 9/2001 | Discenzo | 702/183 |
| 6,602,109 B1 | 8/2003 | Malkin et al. | |
| 6,665,580 B1 * | 12/2003 | Susnjara | 700/175 |
| 6,920,370 B2 | 7/2005 | Wehrli et al. | |
| 6,975,919 B2 | 12/2005 | Kluft | |
| 7,328,081 B2 | 2/2008 | Kluft | |
| 2001/0012973 A1 | 8/2001 | Wehrli et al. | |

(Continued)

FOREIGN PATENT DOCUMENTS

DE  44 05 660 A1  8/1995
DE  199 60 834 A1  7/2001

(Continued)

OTHER PUBLICATIONS

K. Jemielniak "Commercial Tool Condition Monitoring Systems" from "Int J Adv Manuf Technol (1999) 15:711-721".*

(Continued)

*Primary Examiner* — Mohammad Ali
*Assistant Examiner* — Yuhui R Pan
(74) *Attorney, Agent, or Firm* — Oliff PLC

(57) ABSTRACT

A numerically controlled machine tool for machining a workpiece is provided. The machine tool includes a work spindle, at least one feed axis, and a device for collision monitoring on said machine tool, wherein the device for collision monitoring includes a collision sensor mounted on a machine part of the machine tool, collision detection means for detecting a collision of machine parts of the machine tool when a measuring value detected by the collision sensor exceeds a collision limit value, and signal output means for outputting a stop signal for stopping the at least one work spindle and the at least one feed axis, of the machine tool when the collision detection means detects a collision. The machine tool includes a unit for determining the collision limit value on the machine tool.

14 Claims, 5 Drawing Sheets

(56) References Cited

U.S. PATENT DOCUMENTS

| | | |
|---|---|---|
| 2006/0178771 A1 | 8/2006 | Kluft |
| 2008/0125874 A1* | 5/2008 | Takahashi et al. ............ 700/7 |
| 2008/0177403 A1* | 7/2008 | Masuya et al. ............. 700/90 |
| 2009/0048713 A1 | 2/2009 | Glissmann et al. |
| 2010/0204814 A1* | 8/2010 | Neumaier et al. ............ 700/97 |

FOREIGN PATENT DOCUMENTS

| | | |
|---|---|---|
| DE | 101 33 612 A1 | 2/2003 |
| DE | 101 44 459 A1 | 4/2003 |
| DE | 102 22 521 A1 | 12/2003 |
| DE | 10 2005 015 317 A1 | 10/2006 |
| EP | 1 947 537 A1 | 7/2008 |
| JP | A-4-160605 | 6/1992 |
| JP | A-2003-25272 | 1/2003 |
| JP | A-2008-176559 | 7/2008 |
| JP | A-2008-183680 | 8/2008 |
| WO | WO 2010/045997 A1 | 4/2010 |

OTHER PUBLICATIONS

Finley et al. "An Analytical Approach to Solving Motor Vibration Problems" from "Petroleum and Chemical Industry Conference, 1999. Industry Applications Society 46th Annual".*

Ertunc et al. "Drill wear monitoring using cutting force signals" from "Mechatronics 14 (2004) 533-548".*

Feb. 14, 2012 Extended Search Report issued in European Patent Application No. 11181729.2 (with translation).

Sep. 14, 2011 Office Action issued in German Patent Application No. 10 2011 003 374.2 (with translation).

Office Action issued in Japanese Patent Application No. 2012-016070 dated Sep. 17, 2013.

* cited by examiner

MACHINE TOOL COMPRISING A DEVICE FOR COLLISION MONITORING

The present invention relates to a numerically controlled machine tool for machining a workpiece, comprising a work spindle, at least one feed axis and a device for collision monitoring on the machine tool. The device for collision monitoring comprises a collision sensor mounted on a machine part of the machine tool, collision detection means for detecting a collision of machine parts of the machine tool when a measuring value detected by the collision sensor exceeds a collision limit value, and signal output means for outputting a stop signal for stopping the at least one work spindle and the at least one feed axis of the machine tool when the collision detection means detects a collision.

BACKGROUND OF THE INVENTION

In the prior art, generic devices for collision monitoring on a numerically controlled machine tool for machining a workpiece are known which comprise a collision monitoring unit for detecting a collision of machine parts of the machine tool when a measuring value detected by a collision sensor of the collision monitoring unit exceeds a collision limit value (for example, in a collision on the machine tool or when the workpiece is machined too vigorously), and a stop unit for stopping the at least one work spindle and the at least one feed axis of the machine tool when the collision monitoring unit detects a collision.

Such devices as a rule comprise a collision sensor such as, for example, a clip gauge which may be mounted particularly adjacent to the work spindle of the machine tool such as for example, on a milling head of the machine tool. The collision monitoring unit receives a measuring signal of the collision sensor via a signal input and is adapted to detect when the measuring value of the collision sensor exceeds a determined collision limit value.

In this case, the collision limit value of the prior art is predetermined by the manufacturer, for example, to a value of 20 g (g referring to the acceleration of gravity) and cannot be changed by the operator of the machine tool or a programmer of control data for the numerically controlled machine tool.

As soon as the collision monitoring unit detects that the measuring value of the collision sensor exceeds the predetermined collision limit value, a fast shutdown is performed on the machine tool via machine control, i.e. via the programmable logic controller (PLC), in which the drive of the work spindle and the drives of the feed axes of the machine tool are stopped to be able to prevent or at least reduce damage to the machine tool due to the detected collision. Upon detection of a collision by the collision monitoring unit, it is possible, for example, to trigger an emergency stop of the machine tool via the programmable logic controller or to initiate at least a quick stop of the work spindle and the feed axes as soon as the collision monitoring unit detects that the measuring value of the collision sensor exceeds the determined collision limit value. In this course, the drives of the work spindle and the feed axes are stopped and slowed down with as maximum an acceleration as possible, in particular before it can be detected at the machine control that the servo lag on the machine tool exceeds a limit value and before deformation occurs on machine parts of the machine tool.

In this case, the determined collision limit value, as mentioned above, is fixedly set by the manufacturer to a particular maximum acceleration value so that the shutdown of the drives of the work spindle and the feed axes and the emergency stop on the machine tool, respectively, is triggered independently of the machining process by means of a collision detection in dependence of the collision limit value predetermined by the manufacturer.

SUMMARY OF THE INVENTION

With regard to the devices for collision monitoring on a numerically controlled machine tool known in the prior art, it is an object of the present invention to provide a machine tool comprising a device for collision monitoring on the machine tool, which enables an efficient, safe and fast detection of a collision of machine parts on the machine tool and subsequent safe and fast shutdown or stop of the spindles and feed axes on the machine tool to be able to avoid damage to the machine tool in case of a collision in a more efficient and safer manner.

In particular, it is a further object of the present invention to provide a machine tool having a device for collision monitoring which enables a shutdown or stop of the spindles and feed axis on the machine tool in dependence of the machining process in order to be able to avoid damage to the machine tool in case of a collision in a more efficient and safer manner.

For achieving the above-mentioned objects of the present invention, a machine tool according to claim 1 is proposed. Dependent claims relate to preferred designs and exemplary embodiments of the present invention.

According to the present invention, a numerically controlled machine tool for machining a workpiece is proposed, comprising a work spindle, at least one feed axis, and a device for collision monitoring on said machine tool; wherein the device for collision monitoring comprises a collision sensor mounted on a machine part of the machine tool, collision detection means for detecting a collision of machine parts of the machine tool when a measuring value detected by the collision sensor exceeds a collision limit value, and signal output means for outputting a stop signal for stopping the at least one work spindle (optionally with a delay after stopping the feed axis for cutting free the tool) and/or the at least one feed axis of the machine tool when the collision detection means detects a collision.

The present invention is characterized by the fact that the machine tool furthermore comprises a unit for determining (establishing) one or more collision limit values on the machine tool. Thus, the device can enable the setting, predetermining or determining/establishing of one or more collision limit values directly on the machine tool in dependence of the machining or machining process of the machining of the workpiece on the machine tool in an advantageous manner.

In the present invention the collision detection on the machine tool and the subsequent stopping of the work spindle and/or the feed axis or feed axes of the machine tool is thus performed not only on the basis of a non-settable collision limit value generally predetermined by the manufacturer and independent of the machining process, but rather the present invention makes it possible in an advantageous manner to variably set the collision limit value used for collision detection directly on the machine tool so as to be optimal for the respective machining process.

Consequently, the present invention enables a variable adaptation of the collision limit value valid during the machining of the workpiece to machining process-specific properties, e.g. the material of the workpiece or tool, the type of tool used (e.g. drilling tools having different diameters, milling tools having different diameters and/or different numbers of cutting edges, measuring sensors), to the kind of machining (e.g. rough machining, finishing, smoothing or even merely scanning the workpiece by means of a measuring sensor) or even to conditions of individual machining steps or cutting movements during the machining of the workpiece on the machine tool. Thus, the present invention makes it possible to adapt the collision detection on the machine tool to conditions of the respective working process.

According to the invention, it is possible to particularly set the collision limit values adapted to the respective machining phases in an advantageous manner for machining phases during the manufacture of different workpieces and also in individual machining phases during the machining of a workpiece with various occurring maximal loads so that the collision detection of the device for collision monitoring may be optimized for the respective individual machining phases and the conditions thereof. Thus, the present invention advantageously makes it possible to adapt the collision detection on the machine tool to the respective conditions in dependence of the machining process and to variably optimize it to different machining operations and machining phases.

Therefore, as it becomes dynamically possible according to the invention and dependent on the machining to set a collision limit value so as to be optimal, it becomes possible apart from the fast and reliable collision detection to further perform an advantageous process monitoring by means of the collision monitoring unit because a collision limit value set to be lower not only detects "real" collisions, in case of which it is necessary for safety reasons and for protecting the machine to trigger a machine stop as quickly as possible, but should also be able to detect other less machine-damaging events with occurring lower loads and to warn the user also in case of lower loads or trigger a machine stop.

It is possible, for example, to set the collision limit value in dependence of the machining (in particular in dependence of the tool and/or the cutting), for example, by means of a teach function (teach-in or learning function) in which the normally occurring loads are dynamically detected in a sample machining or reference machining (e.g. depending on the tool and/or cutting). Then, respective tool-dependent and/or cut-dependent collision limit values may be set for different machining phases for the actual machining on the basis of the reference machining, which limit values each lie only a small (optionally selectable) tolerance above the loads that were detected in the teach passage. Consequently, it becomes possible already with small load exceedances over the loads detected in the teach passage to warn the user and/or automatically trigger a reaction, such as, for example, a machine stop or at least an axis drive stop in case of further operation of the spindles (e.g. as a cutting-free function for cutting the tools free before a spindle stop in case of a triggered axis drive stop). Thus, the present invention may not only be used for detecting collisions but also additionally or alternatively for optimized process monitoring to already detect small excessive loads or overloads, such as, for example, an occurring tool break.

In this course, the determination of the collision limit value settable on the machine tool in dependence of the machining of the workpiece may advantageously be performed directly on the machine tool, for example, manually by an operator of the machine tool via input means of the device for collision monitoring, by specification during the programming of the machine control or the numerical control of the machine tool (e.g. when programming an NC program) or also by controllable specification values by means of electrical interfaces (e.g. via a bus system or field bus system and analogous interfaces, respectively).

Consequently, according to the invention a machine tool comprising a device for collision monitoring may be provided which enables a machining process-dependent shutdown or stop of the spindles and/or feed axes on the machine tool to be able to avoid damage to the machine tool in case of a collision in a more efficient and safe manner. Thus, the present invention enables a machining process-dependent and variable collision damage protection with fast reactions on the machine tool.

Preferably, the unit for determining the collision limit value on the machine tool is configured such that the collision limit value can be changed on the machine tool while the machining is in operation. This offers the advantage that the collision limit value can not only be set directly on the machine tool for the subsequent machining process but can be adapted to the specifics of the machining directly while the machining is still continuing and set so as to be optimized.

Preferably, the unit for determining the collision limit value on the machine tool comprises setting means for setting the collision limit value by an operator of the machine tool. This enables the operator to manually set the collision value and manually adapt it to the specifics of the machining, respectively, directly on the machine tool and during machining, if necessary.

Preferably, the unit for determining the collision limit value on the machine tool is configured such that the collision limit value can be set in a range smaller than or equal to a maximum collision limit value, in particular in a range smaller than or equal to a collision limit value predetermined by the manufacturer. Thus, it can be guaranteed in an advantageous manner that it is not possible to set the collision limit value too high such that collisions are no longer reliably detected. In addition, it is made possible to set individual collision values below the predetermined collision limit value to the specifics of the machining so that due to the machining a shutdown of the machine can be achieved in case of a tool break, weak impacts or crashes or collisions. For example, the collision limit value may be determined or set as an absolute value or as a relative value relative to the predetermined maximally settable collision limit value (e.g. by means of a percentage indication in relation to the predetermined collision limit value).

This makes it possible to further distinguish between real collisions and overloads, for example, due to tool break, weak impacts, unbalance or bearing damage which may be detected for process monitoring. For example, the collision device may be formed as a process monitoring unit which is adapted to monitor whether the value detected by the collision sensor exceeds the set collision limit value to detect an overload, and whether the value detected by the collision sensor exceeds the maximum collision limit value to detect a real collision that requires an immediate stop of the machine.

To this end, it is furthermore possible to adapt the process monitoring unit such that an absolute machine stop including a stop of all axis drives and spindles is triggered when the value detected by the sensor exceeds the maximum collision value, and to trigger another reaction when the value detected by the sensor exceeds the collision limit value set to be lower. As a reaction for the case that the value detected by the sensor exceeds the collision limit value set to be lower, it is of course also possible to provide the triggering of an absolute machine stop, however, it is also possible to merely output a warning to the user so that the latter may decide himself/herself which reaction is necessary, or it is also possible to provide a cutting-free function which triggers an immediate stop of the drives of one or more feed axes but not to stop spindle drives or at least stop them only with a delay so that the cutting movement is not stopped at once and the tool may thus cut itself free of the workpiece and does not get jammed (this enables an easier startup of the machine after the stop and avoids unnecessary damage to the tool and workpiece). Preferably, it is possible for the operator at the process monitoring unit to set which reaction is to be triggered on the machine for the case that the sensor value exceeds the set collision limit value, and possibly also for the case that the sensor value exceeds the maximum collision limit value.

Furthermore, it is possible to set a plurality of limit values below the maximum limit value and to set different reactions for each range between two limit values. Settable reactions may be the following: A mere warning to the user by an optical display and/or an acoustic warning signal, feed stop (stopping the feed drives of the axes of the machine tools while the spindle drives continue to run) or feed stop with delayed spindle stop (stopping the feed drives of the axes of the machine tool while the spindle drives continue to run shortly and the spindles drives are stopped with a delay to enable the tool to cut free in the workpiece), automatic tool change (e.g. when the exceedance of a limit value suggests a tool break), quick stop of the axes and spindles by using additional braking means. The maximum collision limit value may also be settable in other embodiments.

Preferably, the unit for determining the collision limit value on the machine tool is configured such that the collision limit value may be set in dependence of a tool used for machining the workpiece. Thus, the collision limit value according to a particularly preferred embodiment of the present invention may be set in dependence of a tool used for machining the workpiece, i.e. preferably, the collision limit value is settable in dependence of the machining of the workpiece on the machine tool by the collision limit value being settable in dependence of the tool.

This offers the advantage that it is not necessary to use a single predetermined collision limit value for the entire machining of the workpiece with different tools but that respective tool dependent collision limit values can be set for different machining phases that are performed with different tools. The respective tool-dependently set collision limit values may be directly adapted to the properties of the respective tool.

In this case, it may, for example, be taken into consideration in an advantageous manner that different tools on the machine tool react to too hard machining operations, impacts and collisions with varying degrees of sensitivity. For example, it may be considered that tools having small diameters or measuring sensors used on the machine tool may be strongly damaged in case of weak impacts or collisions, whereas drilling and milling tools having larger diameters are not damaged in case of harder machining, weak impacts or collisions or only to a small degree. For example, measuring sensors in particular have an essentially larger sensitivity than milling or drilling tools. Furthermore, drilling tools are less robust against lateral impacts than milling tools. Thus, this advantageous design of the invention in which tool-dependent collision limit values can be set enables a collision detection taking into consideration the tool used and the sensitivity thereof and enables subsequent fast stopping of spindle and feed axes drives.

In particular, this advantageous design of the invention, in which tool-dependent collision limit values can be set, makes it possible in an advantageous manner that lower collision limit values can be set when more sensitive tools are used so that the limit value is exceeded already in case of weaker collisions and a stop of the spindle and feed axes drives can be initiated in case of weaker collisions. Thus, collision damage to the machine tool in case of a collision or too hard machining can be avoided even more efficiently and safely.

In particular, the tool-dependent setting of collision limit values in different machining phases with different tools makes it possible to adapt the collision detection to the expected maximum loads when the workpiece is machined with the presently used tool, wherein a collision detection with subsequent stopping of the work spindle and the feed axes may ensue in case of small exceedances of the maximum loads expected with the presently used tool.

Preferably, the unit for determining the collision limit value on the machine tool is configured such that the collision limit value may be set by an operator of the machine tool when a tool is changed on the machine tool in dependence of the exchanged tool. This offers the advantage that the operator can manually set the collision limit value to be set and optionally adapt it by hand to the present machining situation directly during machining.

Preferably, the device for collision monitoring comprises collision limit value data storage means for storing collision limit value data indicating tool-dependent collision limit values for a plurality of tools. Thus, the advantage is offered that tool-dependent collision limit values for different tools may be specified in advance in the collision limit value data so that the tool-dependent setting of the collision limit value on the basis of the specifications by the stored collision limit values can be automated or that suggested values can be shown to the operator on the basis of the tool-dependent stored collision limit values for the manual setting in dependence of the tool.

Preferably, the unit for determining the collision limit value is adapted to automatically set the collision limit value in case of a tool change on the machine tool on the basis of the collision limit value stated in the limit value data for the exchanged tool. This offers the advantage that toot-specific or tool-dependent collision limit values can be specified in the collision limit value data and the collision limit value previously set or determined can automatically be set when a tool is exchanged on the machine tool, for example, by means of an automatic tool changer, to the collision limit value stored in the collision limit value data for the exchanged tool.

Preferably, when the collision limit value is automatically set or determined in a tool change, the unit for determining the collision limit value is adapted to set the collision limit value to the predetermined maximum collision limit value in the tool change on the machine tool if no collision limit value for the exchanged tool is stated or stored in the collision limit value data. Thus, it is possible in the above embodiment of the invention to advantageously set a safe collision limit value even if no tool-specific collision limit value is indicated in the collision limit value data for the tool to be exchanged.

As an alternative to the above-described automatic setting of the tool-dependent collision limit value in a tool change on the machine tool for the exchanged tool on the basis of tool-dependent collision limit value data already deposited, provision may also be made that the operator of the machine tool may set or indicate a tool-dependent collision limit value for the exchanged tool via a manual control by way of input means in a tool change until the next tool change. If the operator does not state a collision limit value and no collision limit value data are present for the exchanged tool, then the predetermined maximum collision limit value is preferably set again.

Preferably, the unit for determining the collision limit value is adapted to determine the collision limit value on the basis of control data, in particular on the basis of an NC program by means of which the machining of the workpiece is numerically controlled on the machine tool, the control data preferably indicating at least one collision limit value to be set for one or more machining steps during the machining of the workpiece.

Preferably, the control data and the NC program respectively indicate at least one collision limit value for one or more machining steps during the machining of the workpiece. Thus, the collision limit value can be set in dependence of the machining or the machining process by the fact that the collision limit value can be set for one or more machining steps directly by specification in the control data and the NC program, respectively. For example, the control data may be in the form of a preprogrammed or automatically generated NC program in which program commands are comprised which at predetermined points of time between two machining steps during the machining instruct a setting or resetting of the collision limit value in dependence of the machining step to a value specified in the NC program. Thus, it can automatically be specified in the control data that the collision limit value in the second machining step during the machining is fixed or set to a different value than in the first machining step.

The specification of collision limit values to be set in the control data or in an NC program may be made, for example, in dependence of the tool by already indicating the newly to be set collision limit value with a numerical command in the control data for changing the tool, and/or in dependence of a processing type (e.g. rough machining, finishing, smoothing, scanning operation with scanning by means of a measuring sensor), that is, for example in dependence of a feed speed of one or more feed axes of the machine tool indicated in the control data and/or in dependence of a spindle performance speed or spindle rotational speed indicated in the control data.

Moreover, this design of the invention makes it possible to specify particular collision limit values to be set for special machine tool functions which are indirectly linked to the machining of the workpiece, such as, for example, a collision limit value that is set for the period during a tool change or pallet change.

The specification of collision limit values to be set in the control data makes it possible in an advantageous manner to set machining-specific collision limit values for individual machining steps, for example, also for individual cutting movements or for the faster displacement of feed axes between individual cutting movements or machining steps.

Preferably, the unit for determining the collision limit value is adapted to set the collision limit value for a second machining period on the basis of a maximum measuring value detected during a first machining period by the collision sensor. Here, the machining periods may correspond to an overall machining of a workpiece, a machining in accordance with an NC program or one or more program sections of an NC program, a partial machining of a workpiece, one or more machining steps during the machining of the workpiece and also to individual machining phases with a particular tool, and so on.

This makes it possible in a particularly advantageous, simple manner to automatically set optimally adapted collision values for specific machining phases (e.g. for individual cutting movements and/or machining steps) during the machining of a workpiece on the basis of the maximum loads occurring in normal machining of previous similar or equal machining phases.

For example, it is made possible in an advantageous manner to firstly perform a reference machining of a workpiece on the basis of control data (e.g. an NC program) on the machine tool and, when a further, second workpiece is machined analogously on the basis of the same control data (e.g. by means of the same NC program), when the second workpiece is machined or in individual machining steps when the second workpiece is machined, to set collision limit values optimally adapted to the machining on the basis of the maximum loads during the machining of the first workpiece and in the corresponding individual machining steps, respectively, when the first workpiece is machined during the reference machining (teach or teach-in function). This enables excellent process monitoring in which not only real collisions but also overloads depending on the machining step may be detected which are only slightly above the maximum loads detected in the corresponding machining steps of the reference machining. Thus, it becomes advantageously possible, for example, to detect a tool break in a machining step or even slight overloads in case of tool wear in order to automatically initiate a tool change, if required, due to the detected tool wear.

Preferably, the collision limit value for the second machining period is set as the sum of the maximum measuring value detected during the first machining period by the collision sensor and a tolerance value. This makes it possible to set collision limit values in dependence of preceding maximum loads in a particularly simple manner, wherein due to the additional tolerance value the undesired stopping of the spindle and the feed axes in case of small, normally occurring variations of the loads in the machining periods can be avoided. Thus, on the one hand, optimum machining process-specific collision limit values for fast, safe and efficient collision detection on the basis of preceding machining phases may be set without causing unnecessary machining downtimes due to tolerable measuring value variations. In this case, the tolerance value may be an absolute tolerance value to be added or a relative tolerance value to be added (e.g. 10% or 5% of the maximum collision sensor measuring value(s) detected during the first machining period).

Preferably, the machine tool comprises measuring value storage means for storing the measuring value detected by the collision sensor and/or for storing the course of the detected measuring value in dependence of time. This makes it possible in a particularly simple manner to be able to detect maximum measuring values during particular machining periods on the machine tool. Preferably, the unit for determining the collision limit value is adapted to determine the maximum measuring value detected during the first machining period on the basis of the stored data of the measuring value storage means.

In addition, the storing of the measuring value detected by the collision sensor in dependence of time enables a subsequent analysis of the machining of the workpiece, for example, with regard to maximum occurring loads below the collision limit values, and in case of a collision, a subsequent analysis of the collision and the machine behavior is advantageously enabled before, during and after the collision. Particularly, the storing of the measuring value course in dependence of time enables ex post analyses, especially after a collision, wherein a verification may be made on the basis of the measuring value course whether damage to the machine tool is to be expected, such as, for example, damage to the spindle bearing, and a bearing check should be performed.

Preferably, the first and second machining periods comprise one or more machining steps with the same tool or correspond to machining periods in which the same tool was inserted and used, respectively. Thus, the optimum adaption of the collision limit value to be set on the basis of the maximum loads during the first machining period can be determined according to one of the above aspects additionally in dependence of the tool and may optionally be stored in the collision limit value data for the respective tool.

Preferably, the first and second machining periods comprise one or more machining steps correspondingly to an equal portion of the same control data, in particular an equal NC program, or correspond to machining periods which were each performed on the basis of the same portion of the same control data, in particular the same NC program. Thus, it is possible to determine the optimum adaption of the collision limit value to be set on the basis of the maximum loads additionally in dependence of the control data during the first machining period in accordance with one of the above aspects.

In accordance with a particularly preferred embodiment of the present invention, the device for collision monitoring comprises a collision detection unit having a signal input for an incoming signal of the collision sensor and signal outlets for outputting control signals to a control switching circuit of the machine tool. Preferably, the machine tool comprises a PLC control unit having signal outlets for outputting control signals to the control switching circuit of the machine tool, wherein the collision detection unit is formed separately from the PLC control unit of the machine tool.

Thus, it is possible to advantageously provide a device for collision monitoring having fast reaction times for stopping the spindle and feed axes more safely and faster because the collision detection and the subsequent initiation of the stopping of the spindle and feed axes can directly be triggered, in particular reflex-like, via the fast-reaction electric control switching circuit of the machine tool, and does not have to be performed with slower reaction times via the numerical control (NC) or the programmable logic control (PLC) of the machine tool, as provided for in the prior art. The triggering of an emergency stop or the initiation of the stopping of the spindle and feed axes is thus performed directly and straight without electronic data processing in the numerical control or the programmable logic control by means of a signal from the collision detection unit via the signal output to the electric control switching circuit of the machine tool with the faster reaction times resulting therefrom.

Preferably, the control switching circuit of the machine tool comprises an emergency stop control circuit of the machine tool, the collision detection unit being adapted to output a signal triggering an emergency stop to the emergency stop control circuit when the measuring value of the collision sensor exceeds the collision limit value. Thus, it is advantageously possible to directly trigger a fast and safe emergency stop time on the machine tool automatically within the frame of the emergency stop system of the machine tool with a fast reaction time for slowing down the work spindle and the feed axes with maximum braking acceleration.

Preferably, the collision detection unit further comprises a signal inlet for receiving a limit value signal from the unit for determining the collision limit value. Thus, it is made possible in an advantageous manner that a variably set and manually or automatically specified collision limit value can be communicated to the collision detection unit. Preferably, the strength of the limit value signal depends on the set value of the collision limit value so that the value of the set collision limit value can be communicated by setting the strength of the limit value signal. To this end, the set collision limit value is preferably smaller when the strength of the limit value signal is greater, and vice versa (e.g. in accordance with an indirectly proportional relation or a linear relation with negative gradient). This offers the advantage that in case of a failure of the limit value signal the maximum determined collision limit value is set so that unnecessary and undesired machine downtimes due to a collision limit value that is erroneously set too low can be avoided.

Preferably, the PLC control unit of the machine tool is adapted to output the limit value signal indicating the collision limit value to be set to the collision detection unit. Thus, the setting of the collision limit value can be controlled in a simple manner via the programmable logic control of the machine tool, the shutdown of the spindle and feed axes not being performed via the programmable logic control but further automatically via the electric system with faster reaction times, in particular via the electric control switching circuit.

The collision detection unit may comprise an evaluation unit for evaluating the received limit value signal and the received measuring value to be able to detect a collision. Furthermore, an electric control switching circuit may also be provided in the collision detection unit, having a signal inlet for receiving the limit value signal and a signal inlet for receiving the collision sensor measuring value, wherein both signal inlets may be connected to a comparator to be able to compare the measuring value of the collision sensor with the set collision limit value.

Preferably, the unit for determining the collision limit value on the machine tool is comprised in an NC control unit of the machine tool.

Due to the fast reaction times it is also possible independently of the above-mentioned aspect with settable collision limit values to provide an improved device for collision monitoring having high reaction times for a safer and faster stopping of the spindle and the feed axes. An advantageous machine tool could thus be provided, including a device for collision monitoring comprising a collision sensor mounted on a machine part of the machine tool, a collision detection unit for detecting a collision of machine parts of the machine tool when a measuring value detected by the collision sensor exceeds a collision limit value, and signal output means for outputting a stop signal for stopping the at least one work spindle and the at least one feed axis of the machine tool when the collision detection unit detects a collision, the collision detection unit having a signal inlet for an incoming signal of the collision sensor and signal outlets for outputting control signals to a control switching circuit of the machine tool. Preferably, the machine tool in this case comprises a PLC control unit including signal outlets for outputting control signals to the control switching circuit of the machine tool, the collision detection unit being formed separately of the PLC control unit of the machine tool.

Preferably, the machine tool comprises a display unit for displaying the current measuring value of the collision sensor during the machining of the workpiece on the machine tool, the current measuring value of the collision sensor relative to a maximally settable collision limit value, of the maximally settable collision limit value and/or of the measuring value maximally detected by the collision sensor during a machining period on the machine tool. This offers the advantage that an operator of the machine tool is informed at any time of the current measuring value of the collision sensor, the set collision limit value and/or the predetermined maximum collision limit value, preferably graphically and/or by text display, and is able to monitor both the machining process and the settings of the collision detection. It is also possible to display the maximum measuring value detected during a machining period on the machine tool by the collision sensor to the operator, for example, by means of a drag indicator.

Preferably, the collision sensor is formed as an acceleration sensor, in particular a piezoelectric acceleration sensor. This offers the advantage that other than in the clip gauges used in the prior art, not only a force acting on the collision sensor is detected but an extensive vibration monitoring can be performed, e.g. a vibration monitoring of the work spindle including detecting a vibration velocity of the work spindle.

This makes it possible to advantageously perform an unbalance monitoring for detecting an unbalance on the work spindle during operation with a tool inserted on the work spindle, wherein when an unbalance limit value is exceeded, an unbalance warning and/or stopping of the work spindle can be triggered. Thus, for example, the startup of the spindle with a wrong rotational speed for the inserted tool can be immediately stopped automatically. In addition thereto, vibration monitoring enables bearing monitoring of the bearings of the work spindle during operation of the work spindle without an inserted tool. It may advantageously be performed after a detected collision in order to check whether the bearings of the work spindle have been damaged by the collision.

In the vibration detection it is possible to compare a vibration pattern (comprising data on vibration speeds and/or vibration amplitudes as a function of time) currently occurring and detected in machining to pre-stored vibration patterns that are associated with possible detection states, wherein the detection states may comprise the occurrence of an unbalance on the spindle, the occurrence of a bearing damage to the spindle, the wear of a tool, and/or the break or partial break of a tool. By comparing the currently detected vibration pattern to a plurality of stored vibration patterns associated to a respective detection state, it can be detected which of the detection states occurs in the currently detected vibration pattern to identify the detection state.

Consequently, the present invention may further have the following preferred advantageous aspects.

Preferably, the machine tool, in particular the machine control of the machine tool or the device for collision monitoring further comprises a vibration monitoring unit for monitoring a vibration on the at least one work spindle on the basis of the measuring value detected by the acceleration sensor in dependence of time.

Preferably, the vibration monitoring unit is adapted to determine a vibration velocity of the work spindle on the basis of the measuring value detected by the acceleration sensor in dependence of time.

Preferably, the vibration monitoring unit is adapted to detect an unbalance during operation of the work spindle with an inserted tool on the basis of the measuring value detected by the acceleration sensor in dependence of time.

Preferably, the vibration monitoring unit is adapted to detect a tool break of the tool inserted on the spindle on the basis of the measuring value detected by the acceleration sensor in dependence of time.

Preferably, the vibration monitoring unit is adapted to perform a bearing check of the spindle bearings during operation of the work spindle without an inserted tool on the basis of the measuring value detected by the acceleration sensor in dependence of time.

Preferably, the vibration monitoring unit is adapted to automatically perform a bearing check after the start of operation of the machine tool after a stop of the at least one work spindle and the at least one feed axis of the machine tool when the collision detection means has detected a collision.

Preferably, the device for collision monitoring on the machine tool can be deactivated by an operator of the machine tool. This makes it possible, if necessary, to be able to perform machining operations above the predetermined collision limit value for short-term extreme loads without triggering a collision shutdown.

The above-mentioned and further advantageous aspects of the present invention will be described below with reference to the accompanying figures and preferred embodiments of the present invention.

DETAILED DESCRIPTION OF PREFERRED EXEMPLARY EMBODIMENTS OF THE PRESENT INVENTION

Preferred exemplary embodiments of the present invention are described in detail below with reference to the enclosed figures. However, the present invention is not limited to the exemplary embodiments as described. The present invention is defined by the scope of the claims. Equal and/or similar features of the exemplary embodiments are denoted by equal reference numbers in the figures.

Figure 1:
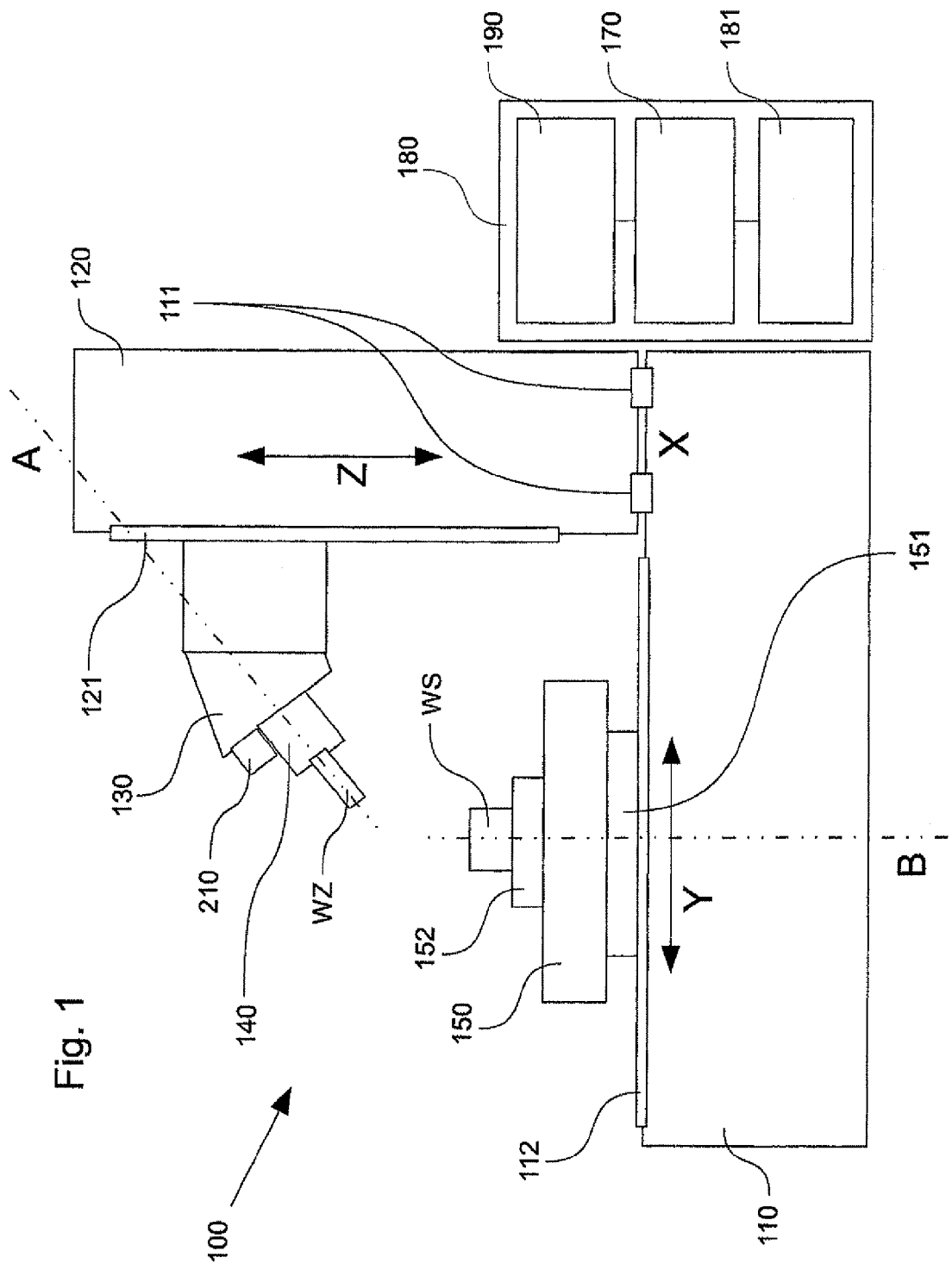
FIG. 1 shows an exemplary schematic view of a numerically controlled machine tool for machining a workpiece according to an embodiment of the present invention.

FIG. 1 shows an exemplary schematic view of a numerically controlled machine tool 100 for machining a workpiece WS. The workpiece WS is clamped in a chucking device 152 on a rotary table 150 of the machine tool 100 so as to be rotationally fixed and can be rotationally driven by means of a rotational axis (see vertical rotational axis in FIG. 1). The rotary table 150 can exemplarily be displaced by means of a carriage 151 on Y guide rails 112 mounted on a machine bed 110 of the machine tool in the Y direction along the Y guide rails 112 by means of a Y feed axis. Furthermore, X guide rails 111 oriented in the X direction and extending perpendicularly to the X direction (that is, perpendicularly to the drawing plane in FIG. 1) are mounted on the machine bed 110 of the machine tool. A machine column 120 is disposed on the X guide rails 111, which can be displaced in the X direction along the X guide rails 111 by means of an X feed axis.

The machine tool further comprises a milling head 130 that can be displaced in the Z direction along Z guide rails 121 by means of a Z feed axis, the Z guide rails 121 being mounted on the machine column 120. In this case, the Z direction exemplarily extends perpendicularly to the X direction and Y direction, respectively. The milling head 130 in FIG. 1 may be rotationally driven by means of a further rotational axis A, for example (see inclined rotary axis in FIG. 1), and on the milling head 130 a tool-supporting work spindle 140 is disposed which is adapted to receive and drive a tool WZ (e.g. a milling tool or a drilling tool) for machining the workpiece WS.

The machine tool furthermore comprises a machine controller 180 for controlling the machine tool including controlling the feed axes X, Y, and Z and the rotational axes A and B on the basis of control data, such as, for example, an NC program. The machine controller comprises an NC control unit 190 (NC for numerical control), a PLC control unit 170

(PLC for programmable logic controller) connected to the NC control unit 190, and an electric control system 181 including control switching circuits connected to the PLC control unit 170 and actuators of the machine tool, for example actuators of the drive control for driving the linear and rotational axes of the machine tool, and for controlling a spindle drive, furthermore optionally for controlling a tool changer, a pallet changer, and/or a chip conveyor of the machine tool or other controllable units of the machine tool.

The NC control unit 190, for example, may comprise a control panel on the machine tool via which an operator of the machine tool 100 can control the machining processes on the machine tool.

An example for a control switching circuit of the electric control system 181 of the machine tool is e.g. the emergency stop control circuit which upon receipt of an emergency stop signal triggers an immediate machine stop and is connected to all required actuators of the machine tool for triggering the emergency stop.

Adjacent to the work spindle 140 a collision sensor 210 is mounted on the milling head 130, which collision sensor 210 is preferably formed as an acceleration sensor, in particular a piezoelectric acceleration sensor. The collision sensor is adapted to detect a vibration and/or an acceleration or acceleration force acting on the milling head 130 and forwards a corresponding measuring value via a sensor signal to an inventive device for collision detection on the machine tool. In the present embodiment a single collision sensor 210 is described, however, according to the present invention additional further collision sensors may be attached to further machine parts of the machine tool.

Figure 2:
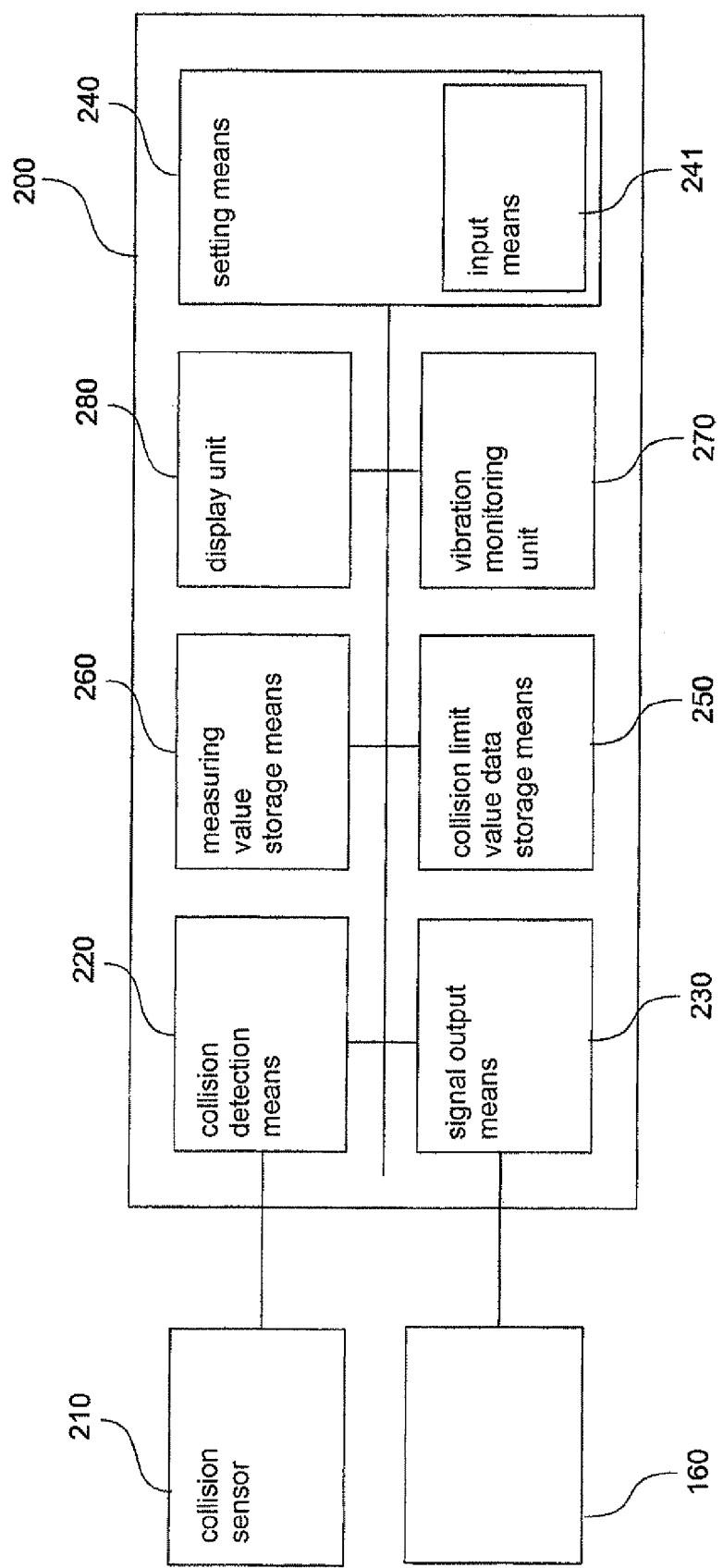
FIG. 2 shows an exemplary schematic view of a device for collision monitoring according to an embodiment of the present invention.

FIG. 2 shows an exemplary schematic view of a device for collision monitoring according to an embodiment of the present invention. The device 200 comprises collision detection means 220 for detecting a collision on the machine tool on the basis of sensor signals of one or more collision sensors, such as, for example, the collision sensor 210 of FIG. 1, and signal output means 230 for outputting control signals for outputting a stop signal for stopping the work spindle 140 and the feed axes X, Y, Z, A, and B of the machine tool when the collision detection means 220 detects a collision (e.g. on actuators 160 of the drive control of the machine tool 100, in particular on actuators of the drive control for controlling the work spindle 140 and/or the feed axes X, Y, Z, and optionally on actuators of the drive control for controlling the rotational axes A and B; furthermore, optionally for controlling actuators of the drive control for actively stopping or slowing down the work spindle 140 and/or the linear and rotational axes of the machine tool and/or their drives).

The signal output means 230 can be indirectly connected to actors 160 of the drive control of the machine tool 100 and with one or more control switching circuits, respectively, of the machine tool 100 via the PLC control unit 170 and/or the NC control unit 190. Preferably, however, the signal output means 230 is connected to actors 160 of the drive control of the machine 100 directly and independently of the PLC control unit 170 and/or the NC control unit 190 via the electric control system 181 of the machine tool 100 so that a faster, more efficient and direct signal output for stopping the machine tool or the spindle and the axes can be performed independently of the clock frequency of the PLC control unit 170 and/or independently of the clock frequency of the NC control unit 190.

A measuring value detected by the collision sensor 210 is output to the collision detection means 220 via a signal connection and the collision detection means 220 monitors the measuring value of the collision sensor 210 in comparison to a predetermined collision limit value (e.g. a collision limit value of, for example, 20 g predetermined by the manufacturer—g describing the acceleration of gravity), the collision detection means 220 then detecting a collision on the machine tool when the measuring value of the collision sensor 210 reaches the predetermined collision limit value or the measuring value of the collision sensor 210 exceeds the predetermined collision limit value, depending on the configuration of the collision detection means 220.

When the collision detection means 220 detects a collision, for example, because the detected measuring value of the collision sensor 210 reaches the predetermined collision limit value during the machining of the workpiece WS or because the measuring value of the collision value 210 exceeds the predetermined collision limit value during the machining of the workpiece WS, the signal output means 230 outputs stop signals to actuators 160 of the drive control of the machine tool 100 to stop the work spindle 140 and at least one of the feed axes X, Y, Z, A, and B of the machine tool or even actively slow them down in order to be able immediately after the detection of the collision to avoid or at least reduce damage due to the collision by the triggered stop on the machine tool 100.

The device 200 further comprises setting means 240 for setting or determining a collision limit value in dependence of the machining of the workpiece WS on the machine tool 100. According to the invention, the collision limit value only be set smaller than or equal to the predetermined collision limit value for safety reasons so that a collision is detected at the latest when the predetermined maximum collision limit value is reached or exceeded.

When the measuring value detected by the collision sensor 210 now reaches the set collision limit value or, depending on the configuration of the collision detection means 220, the measuring value detected by the collision sensor 210 exceeds the set collision limit value, the collision detection means 220 detects a collision, and thus the signal output means 230 outputs stop signals to the electric control system 181 of the machine tool or to actuators 160 of the drive control of the machine tool 100 to stop the work spindle 140 and at least one of the feed axes X, Y, Z, A, and B of the machine tool or preferably even actively slow them down in order to avoid or at least reduce damage due to the collision by the triggered stop on the machine tool 100 immediately after detection of the collision by the collision detection means 220.

As the set collision limit value is set smaller than or equal to the predetermined collision limit value, it is made possible according to the invention to detect a collision and trigger or initiate a stop on the machine tool 100 already when the set collision limit value is reached or exceeded, as a rule even before the usually higher predetermined collision limit value is reached or exceeded.

In this case, it is made possible via the setting means 240 to set a collision limit value that is adapted to the conditions of the machining of the workpiece WS. In this course, the collision limit value may be input, for example, via input means 241 of the device 200.

Here, according to a particularly preferred embodiment, the setting means 240 is a part of the NC control unit 190 of the machine tool 100, however, it may also be provided independently of the NC control unit 190. The display unit 280, the vibration monitoring unit 270, the collision limit value data storage means 250, and/or the measuring value storage means 260 may also be provided as parts of the NC control unit 190.

Furthermore, the device 200 comprises the measuring value storage means 260 for storing a measuring value detected by the collision sensor 210 (optionally storing measuring values as individual values, such as e.g. maximum measuring values, or for storing the measuring value course in dependence of time for enabling later analyses of the measuring value course) and the collision limit value data storage means 250 for storing collision limit value data indicating one or more set collision limit values for the detection of a collision by the collision detection means 220. They may be stored, for example, via a data interface (e.g. via W-LAN, Bluetooth, drives, USB interfaces etc.) and/or entered manually via the input means 241.

According to a particularly preferred design of the invention, the collision limit value data stored in the collision limit value data storage means 250 may indicate a plurality of tool-dependent collision limit values, for example, the collision limit value being automatically set to the value stated for the tool to be exchanged or having been exchanged in an automatic tool changer on the machine tool by means of an automatic tool changer (not shown in FIG. 1 but known e.g. in today's universal milling machines or machining centers).

Thus, it is possible in case of a tool change to automatically activate the value predefined for the tool on the basis of collision limit value data for the tool to be exchanged or having been exchanged. This makes it possible in an advantageous manner to automatically set a respectively fitting tool-dependent collision limit value adapted to or optimized for the conditions of the tool or the sensitivity thereof. For example, it is possible to store collision limit value data stating respective collision limit value data for particular tools on the machine tools in the form of a list or table.

If in case of a tool change no collision limit value data are for the to be exchanged or having been exchanged, the predetermined maximum collision limit value is automatically activated and at least the predetermined maximum collision limit value is valid for the collision detection, respectively, so that for safety reasons a collision detection and subsequent shutdown are always triggered at the latest when the predetermined maximum collision limit value is reached or exceeded.

According to a further particularly suitable and particularly preferred design, the device 200 enables a learning or teach function in which the measuring value storage means 260 stores maximally detected measuring values or measuring value data of the measuring value detected by the collision sensor during the machining for a particular machining phase corresponding to an entire NC program or at least one portion of the NC program in dependence of time, whereupon the collision detection means 220 can obtain a maximum value of the measuring value during the machining phase in a reference cycle of the machining in accordance with the entire NC program or at least one portion of the NC program.

In a further machining cycle of the machining following the reference cycle according to the entire NC program or at least one portion of the NC program a collision limit value is automatically set which corresponds to a sum of a tolerance value and the maximum value of the measuring value of the collision sensor 210 detected during the reference cycle. Thus, it can be guaranteed that on the basis of the reference cycle and the meanwhile occurring maximum measuring value for later cycles of the same or at least similar machining steps or the entire NC program or at least one portion of the NC program an optimized collision limit value as low as possible can automatically be set on the basis of the data of the measuring storage means 260.

In a preferred modified design of the above mentioned teach function a tool-dependent teach function can furthermore be provided in which respectively occurring maximum values of the measuring value of the collision limit value are obtained between individual succeeding tool changes, and thus tool-dependent collision limit values are respectively formed by the sum of a (optionally tool-dependent) tolerance value and the maximum value belonging to the tool respectively exchanged between the tool changes. These values can then be automatically set in the tool change in the machining cycles following the reference cycle.

According to a further preferred design the device 200 furthermore enables to set collision limit values on the basis of control data by means of which the machining of the workpiece on the machine tool is numerically controlled, such as, for example, by collision limit value setting commands in an NC program. The control data may indicate e.g. at least one collision limit value for one or more machining steps during the machining of the workpiece. Thus, it is possible to automatically specify in the control data that the collision limit value assumes a different value in the second machining step during the machining than in the first machining step.

The specification of collision limit values to be set in the control data may be made, for example, in dependence of the tool by stating the collision limit value to be newly set with a numerical command for changing the tool already in the control data, and/or also in dependence of a type of machining (e.g. rough machining, finishing, smoothing, scanning operation with scanning by means of a measuring sensor), that is, for example, in dependence of a feed speed indicated in the control data of one or more feed axes of the machine tool and/or in dependence of a spindle performance or spindle rotational speed stated in the control data. Thus, an operator or programmer of control data may define or specify collision limit values in the control data in dependence on the machining for the complete machining or for individual machining steps in the control data (e.g. directly in the NC program).

This may also be combined with the exemplary embodiment of the setting of the collision limit values on the basis of collision limit value data by specifying a priority according to which e.g. collision limit values indicated in the control data are treated with priority and collision limit values indicated in the collision limit value data are only set if no collision limit values are stated in the control data.

Figure 3:
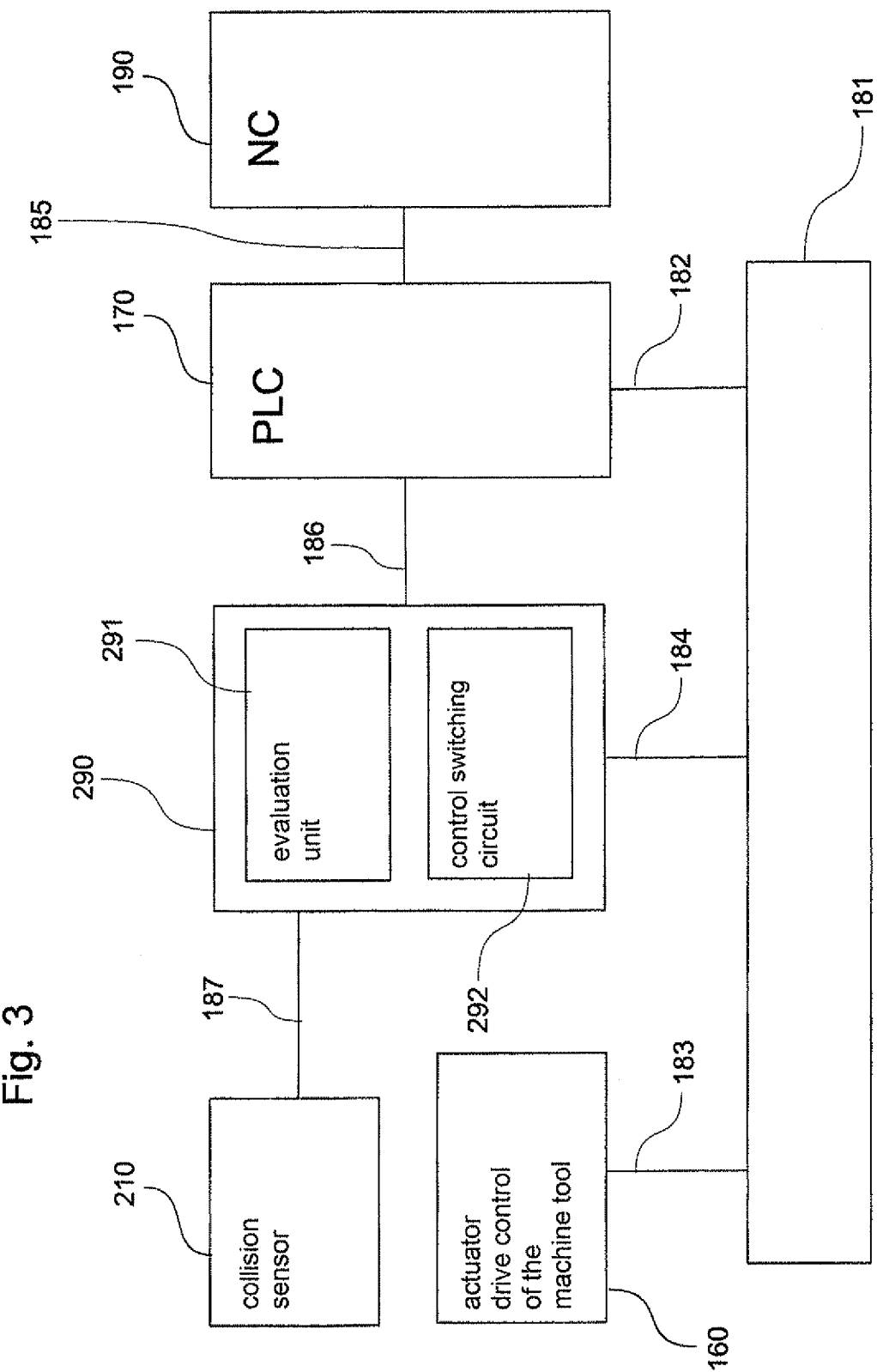
FIG. 3 shows an exemplary schematic view of a device for collision monitoring according to an embodiment of the present invention.

FIG. 3 shows an exemplary schematic view of a device for collision monitoring on a machine tool 100 according to a further embodiment of the present invention. The device comprises a collision detection unit 290 and a collision sensor 210 (in analogy to the collision sensor in FIGS. 1 and 2). The collision detection unit 290 substantially has the function of the collision detection means 220 and the signal output means 230 of FIG. 2.

The collision detection unit 290 is adapted to output control signals for stopping the work spindle 140 and at least one of the feed axes X, Y, Z, A, and B of the machine tool 100 to actuators 160 of the drive control of the machine tool 100 when the measuring value of the collision sensor 210 exceeds the set collision limit value. In the embodiment of FIG. 3 the collision detection unit 290 is connected to a control switching circuit 181 of the machine tool 100 via a signal line 184. The control switching circuit 181 of the machine tool 100 is directly connected to actors of the machine tool via a signal line 183, in particular to actors of the drive control of the machine tool, that is, e.g. with one or more relays for switching on and off the drives on the machine tool, such as, for example, the drives of the spindle 140 and/or feed axes of the machine tool.

In a preferred embodiment the collision detection unit 290 may be connected, for example, to an emergency stop control circuit as a preferred design of the control switching circuit 181 of the machine tool 100, and is adapted to output a signal triggering an emergency stop to the emergency stop control circuit when the measuring value of the collision sensor 210 exceeds the set collision limit value.

The collision detection unit 290 in the embodiment of FIG. 3 is formed independently or separately of the programmable logic controller 170 (PLC for programmable logic controller) of the machine tool 100 which in turn may output control signals to the control switching circuit 181 of the machine tool via a signal line 182. The collision detection unit 290 comprises a signal input for receiving a limit value signal from the programmable logic controller 170 via a signal line 186, which specifies the set collision limit value that can be set directly or indirectly via the programmable logic controller 170.

In the embodiment of FIG. 3 the setting of the variable collision limit value is exemplarily performed only indirectly via the programmable logic controller 170, the setting being performed directly on the NC control unit 190 of the machine tool. The set collision limit value is communicated from the NC control unit 190 to the PLC control unit 170 via a signal line 185 and then communicated to the collision detection unit 290 via a signal line 186.

In this case, the strength of the limit value signal may depend on the set value of the collision limit value such that the limit value signal is output by the programmable logic controller 170 of the machine tool to the electric control switching circuit 290 for specifying the set collision limit value by means of the strength of the limit value signal.

The collision detection unit 290 comprises an evaluating unit 291 which is adapted to receive and evaluate the measuring value detected by the collision sensor 210 via a signal line 187, in particular to monitor whether the measuring value detected by the collision sensor 210 exceeds the collision limit value set at the NC control unit 190 by the PLC control unit 170 via the signal line 186.

If it is detected by means of the evaluation unit 291 that the measuring value of the collision sensor 210 exceeds the set collision limit value, a switch-off or stop signal is output to the control switching circuit 181 of the machine tool 100 via a control switching circuit 292 of the collision detection unit 290 via the signal line 184 for stopping or shutting down the drives of the spindle 140 and the drives of one or more feed axes of the machine tool.

Figure 4:
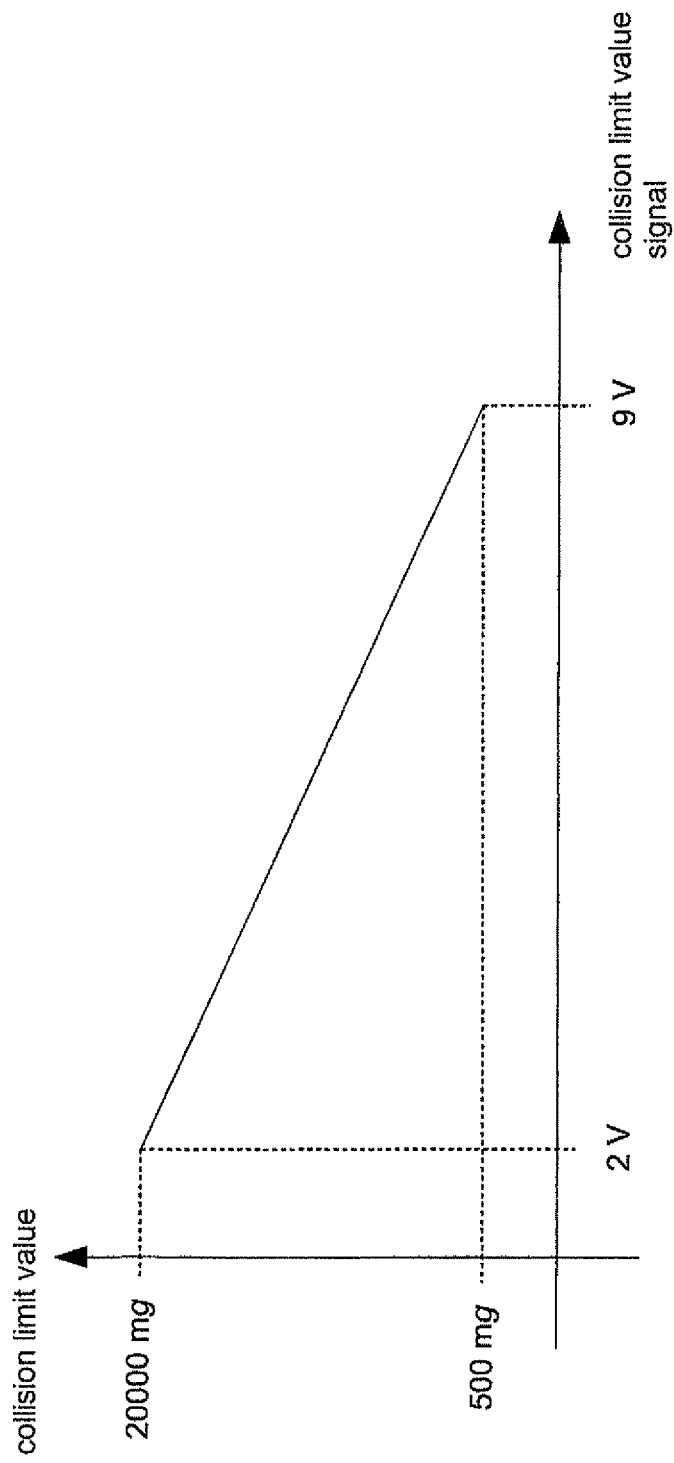
FIG. 4 shows an exemplary relation between a set collision limit value and a collision limit value signal.

FIG. 4 shows an exemplary relation between a set collision limit value and a collision limit value signal, which may be used to communicate a value of the set collision limit value by means of an electric signal via the signal line 186 and/or the signal line 185. A limit value signal received by the programmable logic controller 170 or the NC control unit 190 can be compared to the measuring value communicated by the collision sensor 210 by means of data processing in the evaluation unit or also by means of a comparator in an electric control switching circuit so that the collision detection is specified by the output limit value signal that indicates the set collision limit value.

According to the embodiment of FIG. 2 the device 200 furthermore comprises a vibration monitoring unit 270 for monitoring a vibration on the at least one work spindle 140 on the basis of the measuring value detected by an acceleration sensor (as an embodiment of the collision sensor 201) in dependence of time. The vibration monitoring unit 270 is adapted to determine a vibration velocity of the work spindle on the basis of the measuring value detected by the acceleration sensor in dependence of time.

On the basis of the vibration monitoring by means of the acceleration sensor the vibration monitoring unit 270 is adapted to detect an unbalance during the operation of the work spindle 140 with an inserted tool on the basis of the measuring value detected by the acceleration sensor in dependence of time and to perform a bearing check of the spindle bearings during the operation of the work spindle 140 without an inserted tool on the basis of the measuring value detected by the acceleration sensor in dependence of time.

Finally, the device 200 according to the embodiment of FIG. 2 comprises a display unit 280 for displaying the current measuring value of the collision sensor 210, the set collision limit value, a maximum measuring value of the collision sensor 210, and of the predetermined collision limit value.

Figure 5:
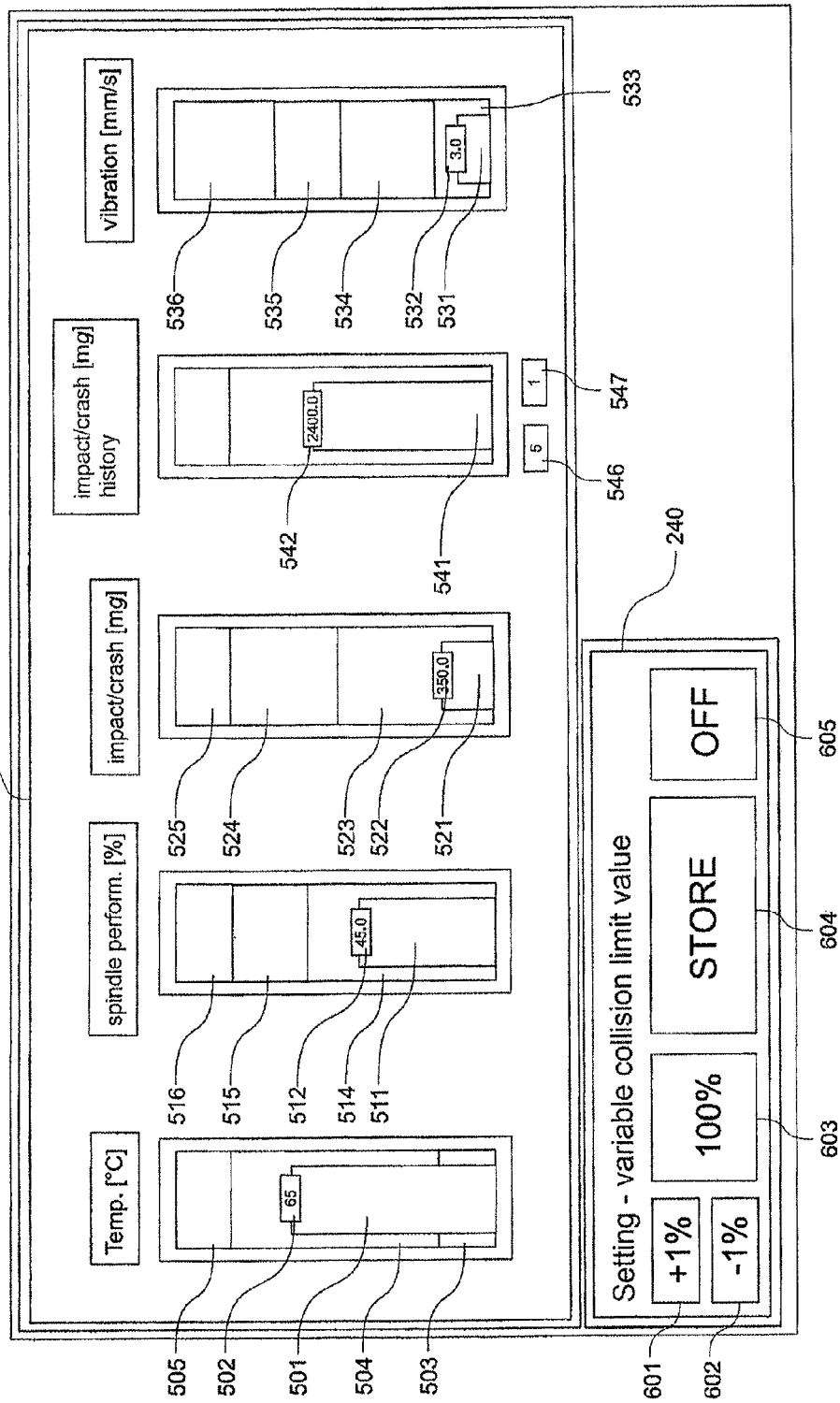
FIG. 5 shows an exemplary view of a display unit on a machine tool according to an embodiment of the present invention.

FIG. 5 shows an exemplary view of a display 281 of a design of the display unit 280 on a machine tool. The display 281 of the display unit 280 is an example a touch screen of the NC control unit 190, which furthermore comprises the operable setting boxes 601, 602, 603, 604, and 605 of an exemplary embodiment of the setting means 240 (the function of the operable setting boxes 601, 602, 603, 604, and 605 will be explained later in more detail).

In this case, an operator of the machine tool of FIG. 5 is exemplarily shown a current temperature on the machine tool in ° C. (see "Temp [° C.]"), the current spindle performance in % of the maximum spindle performance (see "spindle perform. [%]"), the current measuring value of the collision sensor 210 in mg (see "impact/crash" [mg]"), and the current vibration speed in mm/s (see "vibration [mm/s]") by means of a bar display during the machining. The boxes 502, 512, 522, and 532 indicate the respective current numerical values during the machining, wherein these are additionally visualized by the height of the bars 501, 511, 521, and 531.

Behind the respective bars 501, 511, 521, and 531 visualizing the respective current values during machining, ranges are additionally visualized that indicate to the operator whether the current values are within an allowable range or not.

The allowable range for the temperature is displayed by the range 504 and too low temperatures correspond to the range 503 and to high temperatures correspond to the range 505, respectively. Here, the bar 501 exemplarily shows in FIG. 5 that the temperature is currently within the allowable range (range 504).

Regarding the spindle performance the range 514 represents an allowable range for permanent operation and the range 515, respectively, corresponds to a higher spindle load which is still allowed for short machining phases, the range 516 finally showing when the spindle performance is within a non-allowable range in which the spindle is subjected to extreme loads. Here, the bar 511 exemplarily shows in FIG. 5 that the spindle performance is currently within the allowable range (range 514).

Regarding the vibration speed the range 533 represents an allowable range for permanent operation and the range 534 corresponds to a higher vibration speed which is still allowable for short machining phases, the range 535 showing when the spindle performance is within a non-allowable range in which the spindle is subjected to extreme loads. Another range 536 represents a critical range in which the spindle 140 is immediately stopped automatically and an automatic machining stop is triggered. Here, the bar 531 exemplarily shows in FIG. 5 that the vibration speed is currently within the allowable range (range 533).

Regarding the collision detection the range 523 represents an allowable range that extends unto the currently set collision limit value, the range 524 shows the range between the currently set collision limit value and the predetermined maximum collision limit value, and the range 525 shows the range above the predetermined maximum collision limit value. Here, the bar 521 in FIG. 5 exemplarily shows that the measuring value of the collision sensor 210 is currently within the allowable range (range 523) below the currently set collision limit value. Alternatively, of course, only the range 523 may be displayed up to the currently set collision limit value together with the bar 521 and the value 522 because according to the invention a measuring value above the set collision limit value already leads to a collision shutdown and the maximum predetermined collision limit value in FIG. 5 is only displayed as a reference.

In addition to the display of the current measuring value of the collision sensor 210 by means of the bar 521 and the presentation of the value by means of the display 522, information with respect to the measuring value of the collision sensor 210 maximally detected during the previous machining on the machine tool is furthermore provided in the display 281. The bar 541 in FIG. 5 visualizes the maximum previously detected measuring value of the collision sensor 210 as a drag indicator for the maximum previously detected measuring value of the collision sensor 210. The numerical value of the maximum previously detected measuring value of the collision sensor 210 is displayed in box 542. Here, the bar 541 and the box 542 may display, for example, the maximum measuring value detected since the last tool change with the exchanged tool, the maximum measuring value detected since the start of the machining by means of an NC program, the measuring value maximally detected since the start of the machining by means of a portion of an NC program or the measuring value maximally detected since the last startup of the machine tool.

In a box 546 a counter is shown which indicates how often the measuring value detected by the collision sensor 210 has exceeded the set variable collision limit value set by means of the setting means 240 in the previous machining on the machine tool. In another box 547 a counter is shown which indicates how often the measuring value detected by the collision sensor 210 has exceeded the predetermined collision limit value in the previous machining on the machine tool. This enables the operator to check whether the variable collision limit value is correctly set or should be adapted, for example, if the variable collision limit value is set too low for the machining and too often undesired machine downtimes occur due to the respective machine stop after the variable collision limit value is exceeded.

Furthermore, FIG. 5 shows setting boxes 601, 602, 603, 604, and 605 in an exemplary embodiment of the setting means 240, which are exemplarily arranged adjacent to the display 281 and adapted such that the operator of the machine tool can set the variable collision limit value. When the display 281 is designed as a touch screen, the setting boxes 601, 602, 603, 604, and 605 may be integrated in the display 281, as shown in FIG. 5. However, the setting boxes 601, 602, 603, 604, and 605 may also be provided as operating switches or keys adjacent to the display 281.

The setting box 601 can be operated to increase the variable collision limit value from the currently set value by one percentage point. The percentage value makes it possible to set the variable collision limit value relative to the predetermined, maximally settable collision limit value, a setting of 100% meaning that the variable collision limit value is set equal to the predetermined maximally settable collision limit value. The setting box 602 can be operated to reduce the variable collision limit value from the currently set value by one percentage point. The setting box 603 can be operated to set the variable collision limit value from the currently set value to 100% so that the variable collision limit value is set equal to the maximally settable predetermined collision limit value. By operating the operating box 604 the set value is stored and used as a collision limit value on the machine tool. If the operator wishes to increase the currently set variable collision limit value visualized by the bars 523 and 524, for example, by 5 percentage points he or she can operate the setting box 601 five times in a row and store by subsequently operating the setting box 604 so that after operating the setting box 604 the collision limit value increased by five percentage points is used as a collision limit value on the machine in the present machining. Thus, according to the invention and in particular according to the embodiment of FIG. 5, the setting and adapting of the actually used collision limit value is directly possible during the machining of a workpiece on the machine tool.

Finally, according to this embodiment, the setting box 605 exemplarily offers the operator the possibility to temporarily deactivate the collision detection on the machine tool completely so that even when the maximally settable predetermined collision limit value is exceeded by the measuring value detected by the collision sensor 210 no machine stop is triggered. By operating the setting box 603 the collision detection can be re-activated on the basis of the maximally settable predetermined collision limit value and the limit value can again be set so to be variable by means of the operating boxes 601 and 602. This enables the operator on the machine tool to be able to perform short-term machining operations even at very high loads if this is necessary for a particular machining.

Furthermore, it is possible to display to the operator a history of the value detected by the collision sensor as a function of time.

Moreover, it is possible in further embodiments of the invention to determine and set a plurality of collision limit values and specify different reactions for the ranges between the set collision limit values. For example, a maximum collision limit value may be specified so that a quick stop or emergency stop of all drives (stopping of all feed drives or axis drives and spindles drives with maximum breaking delay, for example, by additional breaking means) is triggered if the value detected by the sensor exceeds the maximum collision limit value. In addition thereto, further lower limit values may be input so that an acoustic and/or optical (e.g. by a display) warning is output to the user when a first limit value is exceeded, a tool change is automatically triggered when a second limit value is exceeded, a feed stop (e.g. only stopping of the feed axis drives) is triggered, when a third limit value is exceeded, and/or a cutting-free stop (stopping of the feed axis drives and delayed stopping of the spindle drives) when a fourth limit value is exceeded. In this case the maximum collision limit value may then be used for real collision detection, the lower limit values being process control limit values which may be used, for detecting overloads of a different kind (e.g. for detecting tool wear, for detecting a tool break or partial tool break, for detecting an unbalance on the spindle or also for detecting a bearing damage on the spindle etc.).

In summary, the present invention makes it possible to provide a device for collision monitoring on a machine tool and a machine tool comprising a device for collision monitoring which enable efficient, safe and fast detection of a collision of machine parts of the machine tool and subsequent safe and fast shutdown or stopping of spindles and feed axes on the machine tool to be able to avoid damage to the machine tool more efficiently and safely in case of a collision. In particular, the present invention makes it possible to provide a device for collision monitoring on a machine tool and a machine tool comprising a device for collision monitoring which enable a shutdown or stopping of the spindles and feed axes on the machine tool in dependence of the machining process in order to be able to avoid damage to the machine tool more efficiently and safely in case of a collision.

The invention claimed is:

1. A numerically controlled machine tool comprising:
a milling head supporting a work spindle,
at least one feed axis, and
a monitoring device configured to perform collision monitoring on said machine tool;
wherein the monitoring device comprises:
a collision sensor mounted on the milling head of the machine tool, the collision sensor comprising a vibration sensor configured to detect a vibration of the milling head supporting the work spindle,
a collision detector configured to detect a collision of machine parts of the machine tool when a measuring value detected by the collision sensor exceeds a collision limit value, and
signal output interface adapted to output a stop signal for stopping the at least one work spindle and the at least one feed axis of the machine tool when the collision detector detects a collision; and
a determination unit configured to
automatically set the collision limit value on the machine tool for a second machining period on a basis of a maximum measuring value detected by the collision sensor during a first machining period,
wherein the first machining period is a reference cycle of reference machining a first workpiece based at least one portion of an NC (numerical control) program, and the second machining period is a machining cycle, being performed subsequent to the first machining period, of machining a second workspiece based on the same at least one portion of the same NC (numerical control) program underlying the reference machining of the first machining period.

2. The machine tool according to claim 1, wherein the determination unit is configured such that the collision limit value may be changed during on-going machining on the machine tool.

3. The machine tool according to claim 1, wherein the determination unit comprises an input unit adapted to enable setting the collision limit value by an operator of the machine tool.

4. The machine tool according to claim 1, wherein the determination unit is configured such that the collision limit value can be set in dependence of a tool used during the machining of a workpiece, the determination unit being configured such that the collision limit value may be set by an operator of the machine tool during a tool change on the machine tool in dependence of an exchanged tool.

5. The machine tool according to claim 1, wherein the monitoring device comprises a collision limit value data storage configured to store collision limit value data which indicate tool-dependent collision limit values for a plurality of tools, the determination unit being adapted to automatically set the collision limit value during a tool change on the machine tool on the basis of the collision limit value to be set as indicated in the limit value data for an exchanged tool.

6. The machine tool according to claim 1, wherein the determination unit is adapted to determine the collision limit value on the basis of control data, in particular on the basis of an NC (numerical control) program, by means of which the machining of a workpiece on the machine tool is numerically controlled, the control data indicating at least one collision limit value to be set for one or more machining steps during the machining of the workpiece.

7. The machine tool according to claim 1, comprising a measuring value storage adapted to measure the measuring value detected by the collision sensor and/or store the course of the detected measuring value in dependence of time.

8. The machine tool according to claim 7, wherein
the determination unit is adapted to determine the maximum measuring value detected during the first machining period on the basis of the stored data of the measuring value storage.

9. The machine tool according to claim 1, wherein the first and second machining periods comprise one or more machining steps with the same tool.

10. The machine tool according to claim 1, wherein the monitoring device comprises a collision detector having a signal input for an incoming signal of the collision sensor and signal outputs for outputting control signals to a control switching circuit of the machine tool, the machine tool comprising a PLC (programmable logic control) control unit having signal outputs for outputting control signals to the control switching circuit of the machine tool, the collision detector being formed separately of the PLC (programmable logic control) control unit of the machine tool and the control switching circuit of the machine tool comprising an emergency stop control circuit of the machine tool wherein the collision detector is adapted to output a signal triggering an emergency stop to the emergency stop control circuit when the measuring value of the collision sensor exceeds the collision limit value.

11. The machine tool according to claim 1, comprising a display unit adapted to display a current measuring value of the collision sensor during the machining of a workpiece on the machine tool, of the collision sensor relative to a maximally settable collision limit value, of the maximally settable collision limit value and/or of the measuring value maximally detected by the collision sensor during a machining period on the machine tool.

12. The machine tool according to claim 1, wherein the collision sensor is formed as an acceleration sensor, in particular a piezoelectric acceleration sensor, the machine tool further comprising a vibration monitoring unit adapted to monitor a vibration on the at least one work spindle on the basis of the measuring value detected by the acceleration sensor in dependence of time.

13. The machine tool according to claim 12, wherein the vibration monitoring unit is adapted to determine a vibration velocity of the work spindle on the basis of the measuring value detected by the acceleration sensor in dependence of time, to identify an unbalance during the operation of the work spindle with an inserted tool on the basis of the measuring value detected by the acceleration sensor in dependence of time, and/or to perform a bearing check of the spindle bearings during the operation of the work spindle without an inserted tool on the basis of the measuring value detected by the acceleration sensor in dependence of time.

14. The machine tool according to claim 12, wherein the vibration monitoring unit is adapted to automatically perform a bearing check after the startup of the machine tool after a stop of the at least one work spindle and the at least one feed axis of the machine tool when the collision detector has detected a collision.

* * * * *